United States Patent
Willey

(10) Patent No.: US 9,835,767 B2
(45) Date of Patent: Dec. 5, 2017

(54) ADAPTATION LAYER FOR ANTIREFLECTIVE DESIGNS ON LENSES OF VARIOUS REFRACTIVE INDEXES

(71) Applicant: ESSILOR INTERNATIONAL (COMPAGNIE GENERALE D'OPTIQUE), Charenton-le-Pont (FR)

(72) Inventor: Ronald R. Willey, Charlevoix, MI (US)

(73) Assignee: ESSILOR INTERNATIONAL (COMPAGNIE GENERALE D'OPTIQUE), Charenton-le-Pont (FR)

(*) Notice: Subject to any disclaimer, the term of this patent is extended or adjusted under 35 U.S.C. 154(b) by 0 days.

(21) Appl. No.: 14/974,254

(22) Filed: Dec. 18, 2015

(65) Prior Publication Data

US 2016/0178932 A1 Jun. 23, 2016

(30) Foreign Application Priority Data

Dec. 23, 2014 (EP) .................................... 14307159

(51) Int. Cl.
*G02C 7/02* (2006.01)
*G02B 1/11* (2015.01)
*G02B 1/115* (2015.01)

(52) U.S. Cl.
CPC ................ *G02B 1/11* (2013.01); *G02B 1/115* (2013.01); *G02C 7/022* (2013.01)

(58) Field of Classification Search
CPC ........ G02B 27/022; G02B 1/11; G02B 1/115; G02B 7/00; G02C 13/001; G02C 7/022; G02C 2202/16
USPC ...... 351/159, 159.6, 159.01, 159.09, 159.55, 351/159.62, 159.7
See application file for complete search history.

(56) References Cited

U.S. PATENT DOCUMENTS

| | | | |
|---|---|---|---|
| 3,781,090 A | 12/1973 | Sumita | |
| 4,387,960 A | 6/1983 | Tani | |
| 5,147,125 A | 9/1992 | Austin | |
| 5,725,959 A * | 3/1998 | Terada | G02B 1/115 359/359 |
| 2008/0002260 A1* | 1/2008 | Arrouy | G02B 1/116 359/586 |
| 2011/0033681 A1* | 2/2011 | Adachi | G02B 1/115 428/212 |
| 2011/0134388 A1* | 6/2011 | Hsu | G02C 7/06 351/159.48 |
| 2012/0019915 A1* | 1/2012 | Yan | B32B 33/00 359/586 |
| 2012/0141770 A1* | 6/2012 | Cadet | C01B 33/145 428/312.6 |
| 2012/0300170 A1* | 11/2012 | Fournand | G02B 1/115 351/159.01 |
| 2014/0078589 A1* | 3/2014 | Fujii | G02B 1/11 359/601 |
| 2015/0009570 A1* | 1/2015 | Amano | G02B 1/11 359/601 |

FOREIGN PATENT DOCUMENTS

GB 1591064 6/1981

* cited by examiner

*Primary Examiner* — Darryl J Collins
(74) *Attorney, Agent, or Firm* — Norton Rose Fulbright US LLP

(57) ABSTRACT

The present invention relates to an antireflective stack designed to provide similar reflected light characteristics on lenses of various refractive indexes. This antireflective stack may be coated on an ophthalmic lens, especially a spectacle lens.

12 Claims, No Drawings

ADAPTATION LAYER FOR ANTIREFLECTIVE DESIGNS ON LENSES OF VARIOUS REFRACTIVE INDEXES

FIELD OF THE INVENTION

The present invention relates to an antireflective stack designed to provide similar reflected light characteristics on lenses of various refractive indexes. This antireflective stack may be coated on an ophthalmic lens, especially a spectacle lens.

DESCRIPTION OF RELATED ART

Antireflection coatings are usually deposited on transparent substrates used in optical applications. The function of such a coating is to reduce light reflection on optical substrate and therefore to increase light transmission. A substrate thus coated will therefore have its transmitted light/reflected light ratio increased, thereby improving the visibility of objects placed behind it and limiting ghost images.

An antireflection coating usually consists of a multilayer comprising interferential thin layers, generally an alternation of layers based on a dielectric material of high refractive index and a dielectric material of low refractive index.

In ophthalmic field, antireflective coatings are designed and optimized to reduce reflection in the visible region, generally acknowledged to be 380 nm-780 nm. Several characteristics of reflected light may be considered. Regarding intensity, mean light reflection factor Rv lower than 2% is very often obtained. Regarding colour of reflected light, antireflective coatings may be designed to show green, red, purple or yellow appearance. This colour is a signature of the antireflective coating and has a great cosmetic importance on the market.

When designing an antireflective coating, one has to define the spectrum on which light reflection should be optimized. This is usually the whole visible spectrum 380 nm-780 nm: a broad band of wavelength. One has also to define the wavelength for which the antireflective stack is optimized: usually a wavelength which is in high sensitivity of human eye and in the central part of visible light spectrum, typically in the 450 nm-580 nm range. This wavelength is called "design wavelength" and all layer thicknesses will be defined by reference to this design wavelength. Typically, quarter wavelength and half wavelength layers, i.e. layers whose optical thickness is a quarter and half of the design wavelength, are major layers in broad band antireflective stacks. Last, the refractive index of substrate has to be considered and antireflective coatings have to be designed specifically. Actually, a small change in antireflective stack design—i.e. thicknesses and refractive indices of interferential thin layers or substrate refractive index—will induce noticeable changes in reflected light characteristics.

To offer a full range of ophthalmic lenses with similar colour characteristics, using various substrates to optimize power, curvature and weight of lenses, one requires several antireflective coating designs. A single design yielding similar colour characteristics on various substrates would be highly useful.

U.S. Pat. No. 3,432,225 describes antireflective coatings based on quarter wave and half wave layers. These antireflective coating are very broadly used in ophthalmic industry.

European patent EP2122392 describes layers located between the substrate and the antireflective stack to improve mechanical properties. The thickness of these layers is defined by a balance between mechanical strength obtained with higher thickness and light transmission optimized with lower thicknesses. In addition, to avoid interferences, the refractive index of this mechanical layer is the same as the substrate refractive index: optically, this layer has almost no effect.

SUMMARY OF THE INVENTION

An object of the invention is to design "one size fits all" antireflective stacks, providing similar colour characteristics when coated on substrates having different refractive index comprised between $n_{min}$ and $n_{max}$. For this purpose, an adaptation layer is incorporated in antireflective stack. Said adaptation layer has a three-quarter wave thickness and an intermediate refractive index between $n_{min}$ and $n_{max}$. For the design wavelength, a three-quarter wave layer will have the same effect as a single quarter wave layer. However, for wavelength away from design wavelength, a three-quarter wave layer brings better interference conditions to reduce light reflection and fringes over the whole visible spectrum. Such a layer broadens antireflective stack performance over a range of different substrates with refractive indexes between $n_{min}$ and $n_{max}$.

The invention therefore relates to an ophthalmic lens comprising a transparent substrate with at least one face of said substrate coated with an antireflective stack comprising:
a layer Lmed having:
  a thickness of a three-quarter-wave layer for a design wavelength in the range 450 nm-580 nm, and
  a refractive index in the range 1.5-1.70, and
  a refractive index different from the refractive index of substrate
At least one layer different from Lmed having a refractive index higher than 1.6,
At least one layer different from Lmed having a refractive index lower than 1.55.

The invention relates also to an antireflective stack suited for coating ophthalmic lenses.

The invention relates also to a method of fabrication of spectacles, and spectacles obtained by this method.

DETAILED DESCRIPTION OF THE INVENTION AND PREFERRED EMBODIMENTS

In the present invention, an ophthalmic lens is an optical element disposed on or near the eye of a wearer and aims at correcting wearer's vision, protecting wearer's eyes and/or enhance wearer's vision. Non limiting examples of ophthalmic lenses include non-corrective (also called plano or afocal lens) and corrective lenses, including single vision or multi-vision lenses like bifocal, trifocal or progressive lenses, which may be either segmented or non-segmented. Ophthalmic lenses may be semi-finished lenses or finished lenses.

The ophthalmic lens according to the invention comprises a substrate and an antireflective coating.

The substrate can be of any type used in ophthalmic industry, including mineral glass or organic substrate.

Organic substrate may be a thermoplastic material, selected from, for instance: polyamides; polyimide; polysulfones; polycarbonates and copolymers thereof; poly(ethylene terephtalate) and polymethylmethacrylate (PMMA).

As used herein, a polycarbonate (PC) is intended to mean either homopolycarbonates or copolycarbonates or block copolycarbonates.

Organic substrate may be also a thermoset material, selected from, for instance: cycloolefin copolymers such as ethylene/norbornene or ethylene/cyclopentadiene copolymers; homo- and copolymers of allyl carbonates of linear or branched aliphatic or aromatic polyols, such as homopolymers of diethylene glycol bis(allyl carbonate) (CR 39®); homo- and copolymers of (meth)acrylic acid and esters thereof, which may be derived from bisphenol A; polymer and copolymer of thio(meth)acrylic acid and esters thereof, polymer and copolymer of allyl esters which may be derived from Bisphenol A or phtalic acids and allyl aromatics such as styrene, polymer and copolymer of urethane and thiourethane, polymer and copolymer of epoxy, and polymer and copolymer of sulphide, disulfide and episulfide, and combinations thereof.

As used herein, a (co)polymer is intended to mean a copolymer or a polymer. As used herein, a (meth)acrylate is intended to mean an acrylate or a methacrylate.

Particularly recommended substrates include those substrates obtained through (co)polymerization of the diethyleneglycol bis-allyl-carbonate, marketed, for example, under the trade name CR-39® by the PPG Industries company (ORMA® lenses, ESSILOR), or polyurethanes, marketed for instance under MR series by Mitsui, or allylic and (meth)acrylic copolymers, having a refractive index between 1.54 and 1.58.

Refractive indices of these substrate typically ranges from 1.45 (for very low index mineral glasses like fused silica) up to 1.95 (for very high index mineral glasses like LASF series available from Schott). Organic substrates have refractive indices typically from 1.5 to 1.74, especially with refractive indices of 1.5 or 1.55 or 1.6 or 1.67 or 1.74. These values of refractive indices have been adopted in ophthalmic industry as usual values.

Substrate used in the invention may also be coated to bring additional properties to the substrate, like anti abrasion and/or anti scratch.

Anti-abrasion and/or scratch-resistant coatings are preferably hard coatings based on poly(meth)acrylates or silanes, generally comprising one or more mineral fillers intended to increase the hardness and/or the refractive index of the coating once cured.

Hard anti-abrasion and/or scratch-resistant coatings are preferably prepared from compositions comprising at least one alkoxysilane and/or a hydrolyzate thereof, obtained for example through hydrolysis with a hydrochloric acid solution and optionally condensation and/or curing catalysts.

Suitable coatings, that are recommended for the present invention include coatings based on epoxysilane hydrolyzates such as those described in the patents FR 2702486 (EP 0614957), U.S. Pat. No. 4,211,823, and U.S. Pat. No. 5,015,523.

A preferred anti-abrasion and/or scratch-resistant coating composition is the one disclosed in the patent FR 2 702 486, in the name of the applicant. It comprises a hydrolyzate of epoxy trialkoxysilane and dialkyl dialkoxysilane, colloidal silica and a catalytic amount of an aluminum-based curing catalyst such as aluminium acetylacetonate, the rest being essentially composed of solvents traditionally used for formulating such compositions. Preferably, the hydrolyzate used is a hydrolyzate of γ-glycidoxypropyltrimethoxysilane (GLYMO) and dimethyldiethoxysilane (DMDES).

The anti-abrasion and/or scratch-resistant coating composition may be deposited onto the main face of the substrate by dip- or spin-coating. It is then cured by a suitable method (preferably using heat or ultraviolet radiation).

The thickness of the anti-abrasion and/or scratch-resistant coating does generally vary from 2 to 10 μm, preferably from 3 to 5 μm.

Prior to depositing the abrasion-resistant coating and/or the scratch-resistant coating, it is possible to apply onto the substrate a primer coating to improve the impact resistance and/or the adhesion of the subsequent layers in the final product. This coating may be any impact-resistant primer layer traditionally used for articles in a transparent polymer material, such as ophthalmic lenses.

Preferred primer compositions include compositions based on thermoplastic polyurethanes, such as those described in the Japanese patents JP 63-141001 and JP 63-87223, poly(meth)acrylic primer compositions, such as those described in the U.S. Pat. No. 5,015,523, compositions based on thermosetting polyurethanes, such as those described in the patent EP 0404111 and compositions based on poly(meth)acrylic latexes or polyurethane type latexes, such as those described in the U.S. Pat. No. 5,316,791 and EP 0680492.

Preferred primer compositions are compositions based on polyurethanes and compositions based on latexes, especially polyurethane type latexes optionally containing polyester units.

Commercially available primer compositions to be suitably used in the present invention include compositions such as Witcobond® 232, Witcobond® 234, Witcobond® 240, Witcobond® 242, Neorez® R-962, Neorez® R-972, Neorez® R-986 and Neorez® R-9603.

Combinations of such latexes may also be used in the primer, especially of polyurethane type latexes and poly (meth)acrylic latexes.

Such primer compositions may be deposited onto the article faces by dip- or spin-coating, thereafter be dried at a temperature of at least 70° C. and up to 100° C., preferably of about 90° C., for a time period ranging from 2 minutes to 2 hours, generally of about 15 minutes, to form primer layers having thicknesses, after curing, of from 0.2 to 2.5 μm, preferably of from 0.5 to 1.5 μm.

Anti-abrasion and/or scratch-resistant coatings have usually a refractive index ranging from 1.5 to 1.7, more often ranging from 1.5 to 1.65.

For high refractive index coatings, mineral particles are usually added in the coating composition. If substrate and anti-abrasion and/or scratch-resistant coatings have different refractive indices, optical defects known as fringes may appear. To avoid fringe effect, one has to match refractive indices of substrate and anti-abrasion and/or scratch-resistant coatings. Another approach is to include a quarterwave layer between the substrate and anti-abrasion and/or scratch-resistant coatings, but such a quarter wave layer can not compensate for a large difference of refractive indices.

In the following, substrate means a coated or uncoated substrate.

For uncoated substrate, the refractive index of the substrate is the refractive index of the mineral or organic material used.

For coated substrate, the refractive index of the substrate mean the refractive index of the anti-abrasion and/or scratch-resistant coating.

According to the invention, an antireflective coating is deposited on the substrate.

Prior to depositing the antireflective coating onto the optionally coated substrate, the surface of said optionally coated substrate is optionally submitted to a physical or chemical surface activating treatment, so as to reinforce the adhesion of the antireflective coating. Such pre-treatment is generally conducted under vacuum. It may be a bombardment with energetic and/or reactive species, for example with an ion beam ("Ion Pre-Cleaning" or "IPC"), a corona discharge treatment, an ion spallation treatment, an ultraviolet treatment or a plasma-mediated treatment under vacuum, generally using an oxygen or an argon plasma. It may also be an acid or basic treatment and/or a solvent-based treatment (water, hydrogen peroxide or any organic solvent).

An antireflective coating is typically a multilayered coating, in which layers having different refractive indices are laid one on the other. The multilayered antireflective coating of the invention comprises a stack of:
  a layer Lmed having:
    a thickness of a three-quarter-wave layer for a design wavelength in the range 450 nm-580 nm, and
    a refractive index in the range 1.5-1.70, and
    a refractive index different from the refractive index of substrate
  At least one layer different from Lmed having a refractive index higher than 1.6 (HI),
  At least one layer different from Lmed having a refractive index lower than 1.55 (LI).

An antireflective coating is usually designed for a specific wavelength, known as design wavelength. For this particular design wavelength, antireflective coating is especially efficient. For wavelength away from the design wavelength, antireflective coating is less optimized, hence less effective.

In ophthalmic applications, antireflective coating should be efficient over the whole visible light spectrum. In such a broad band antireflective coating, the skilled artisan chooses a design wavelength and tries to broaden on a large spectrum the antireflection coating performances. The design wavelength is usually chosen in the centre of the visible spectrum, taking also into account the sensitivity of human eye and the wavelength range in which the antireflective coating should be very efficient. As a result, design wavelength usually ranges from 450 nm to 580 nm, preferably from 480 nm to 550 nm and more preferably from 500 nm to 530 nm. Very often 510 nm is used as a design wavelength in antireflective stack design.

Surprisingly, inventors observed that a three quarter wave layer of intermediate refractive index helps in broadening the efficiency of an antireflective coating for substrates having refractive indices in a wide range.

Lmed layer is a three quarter wavelength layer. It means that the optical thickness of Lmed layer is three quarter of the design wavelength of the antireflective coating.

If Lmed and the substrate had the same refractive index, Lmed would appear from an optical point of view as an undistinguishable part of the substrate. It is known in ophthalmic industry to have such layers or underlayers. But the function of such layers is mechanical enhancement. In the invention, the refractive index of Lmed layer is different from the substrate refractive index. This difference is usually larger than 0.01. In some embodiments, this difference is larger than 0.03, and may be larger than 0.05.

In a specific embodiment, the refractive index of Lmed layer is determined according to the range of refractive indices of substrates to be coated. If the lowest substrate refractive index is $n_{min}$ and the highest substrate refractive index is $n_{max}$, Lmed refractive index will be chosen in the range $[n_{min}+0.01; n_{max}-0.01]$. Preferably, Lmed refractive index is chosen in the centre of the range $[n_{min}+0.01; n_{max}-0.01]$, for instance Lmed refractive index may be $(n_{min}+n_{max})/2$. The invention is particularly efficient when $n_{min}$ and $n_{max}$ differ by 0.035 or more.

Usually, Lmed refractive index will be in the range [1.5; 1.95].

In a particular embodiment, when the highest substrate refractive index $n_{max}$ is lower than or equal to 1.81, Lmed refractive index will be in the range [1.5; 1.70].

For instance, for substrates in the range [1.5; 1.6], Lmed refractive index may be set at 1.55. For a design wavelength of 500 nm, the physical thickness of Lmed would be 242 nm.

For substrates in the range [1.5; 1.81], Lmed refractive index may be set at 1.65. For a design wavelength of 530 nm, the physical thickness of Lmed would be 241 nm.

In an embodiment, the Lmed layer comprises one or more metal oxides such as, without limitations, alumina ($Al_2O_3$), mixtures of silica and alumina with preferably at least 50% of alumina in weight, silicon oxynitrides ($SiO_xN_y$) obtained by vacuum deposition of silicon with a ratio of oxygen to nitrogen in the deposition chamber in the range [0.2-5]. For a medium refractive index in the range [1.55-1.7], alumina and silicon oxynitrides with oxygen to nitrogen ratio in the deposition chamber in the range [0.25-2] are suitable. The Lmed layer can also be obtained by mixing at least one high index (HI) oxide as defined below with at least one low index (LI) oxide as defined below.

In a specific embodiment, Lmed layer is in first position in the direction moving away from the substrate in the antireflective coating. By first position, it is meant that Lmed layer is in direct contact with the substrate.

Usually, the layer total number in the antireflective coating is higher than or equal to 3, preferably higher than or equal to 4, and lower than or equal to 9, more preferably lower than or equal to 7, and more preferably equal to 5 layers.

In a specific embodiment, the multilayered antireflective coating of the invention comprises at least two layers having a refractive index higher than 1.6 (HI) and at least two layers having a refractive index lower than 1.55 (LI).

As used herein, a layer of the antireflective coating is defined as having a thickness higher than or equal to 1 nm. Thus, any layer having a thickness lower than 1 nm will not be considered when counting the number of layers in the antireflective coating.

HI layers and LI layers don't need to alternate with each other in the stack, although they also may, according to one embodiment of the invention. Two HI layers (or more) may be deposited onto each other, as well as two LI layers (or more) may be deposited onto each other.

In the present application, a layer of the antireflective coating is said to be a layer with a high refractive index (HI) when its refractive index is higher than or equal to 1.6, preferably higher than or equal to 1.7, even more preferably higher than or equal to 1.8 and most preferably higher than or equal to 1.9. Said HI layer preferably has a refractive index lower than 2.1. A layer of an antireflective coating is said to be a low refractive index layer (LI) when its refractive index is lower than 1.55, preferably lower than or equal to 1.48, more preferably lower than or equal to 1.47. Said LI layer preferably has a refractive index higher than 1.1.

Unless otherwise specified, the refractive indexes referred to in the present application are expressed at 25° C., at atmospheric pressure and at a wavelength of 550 nm.

The HI layer is a traditional high refractive index layer that is well known in the art. It generally comprises one or more metal oxides such as, without limitation, zirconia (ZrO2), titanium dioxide (TiO2), alumina (Al2O3), tantalum pentoxide (Ta2O5), silicon nitride (Si$_3$N$_4$), neodymium oxide (Nd2O5), praseodymium oxide (Pr2O3), praseodymium titanate (PrTiO3), lanthanum oxide (La2O3), niobium oxide (Nb2O5), yttrium oxide (Y2O3). Optionally, the HI layers may further contain silica or other materials with a low refractive index, provided they have a refractive index higher than or equal to 1.6 as indicated hereinabove. The preferred materials include TiO2, PrTiO3, ZrO2, Al2O3, Y2O3 and mixtures thereof.

The LI layer is also well known and may comprise, without limitation, Silicon oxide, or a mixture of silica and alumina, especially silica doped with alumina, the latter contributing to increase the antireflective coating thermal resistance. The LI layer is preferably a layer comprising at least 80% by weight of silica, more preferably at least 90% by weight of silica, relative to the layer total weight, and even more preferably consists in a silica layer. Preferably, the LI layers in the antireflective coating are not MgF2 layers.

Optionally, the LI layers may further contain materials with a high refractive index, provided the refractive index of the resulting layer is lower than 1.55.

When a LI layer comprising a mixture of SiO$_2$ and Al$_2$O$_3$ is used, it preferably comprises from 1 to 10%, more preferably from 1 to 8% and even more preferably from 1 to 5% by weight of Al$_2$O$_3$ relative to the SiO$_2$+Al$_2$O$_3$ total weight in such layer.

For example, SiO$_2$ doped with 4% Al$_2$O$_3$ by weight, or less, or SiO$_2$ doped with 8% Al$_2$O$_3$ may be employed. SiO$_2$/Al$_2$O$_3$ mixtures, that are available on the market may be used, such as LIMA® marketed by the Umicore Materials AG company (refractive index n=1.48-1.50 at 550 nm), or L5® marketed by the Merck KGaA company (refractive index n=1.48 at 500 nm).

Generally, the HI layers have a physical thickness ranging from 10 to 160 nm, and the LI layers have a physical thickness ranging from 10 to 120 nm.

Generally, the antireflective coating total thickness is lower than 1 micrometer, preferably lower than or equal to 800 nm, more preferably lower than or equal to 500 nm and even more preferably lower than or equal to 250 nm. The antireflective coating total thickness is generally higher than 100 nm, preferably higher than 150 nm.

The various layers of the antireflective coating are preferably deposited by chemical vapor deposition, under vacuum, according to any of the following methods:
 i) by evaporation, optionally ion-beam assisted;
 ii) by ion-beam sputtering;
 iii) by cathode sputtering;
 iv) by plasma-assisted chemical vapor deposition.

These various methods are described in the following references "Thin Film Processes" and "Thin Film Processes II," Vossen & Kern, Ed., Academic Press, 1978 and 1991, respectively. Preferably, the deposition of each of the layers of the antireflective coating is conducted by evaporation under vacuum or sputtering.

An ophthalmic lens according to the invention has very efficient antireflection performances. The mean reflection factor, Rm, over a wavelength range 400 nm to 700 nm for a face of the substrate coated with an antireflective stack is lower or equal to 3%, preferably lower or equal to 2.5% for an angle of incidence lower than or equal to 35°, typically 15°.

The mean light reflection factor, Rv, over a wavelength range 380 nm to 780 nm for a face of the substrate coated with an antireflective stack is lower or equal to 2%, preferably lower or equal to 1.5% for an angle of incidence lower than or equal to 35°, typically 15°.

The invention relates also to an antireflective stack suited for coating substrates for ophthalmic lenses comprising:
 a. a layer Lmed having:
  i. a thickness of a three-quarter-wave layer for a design wavelength in the range 450 nm-580 nm, and
  ii. a refractive index in the range 1.5-1.70, and
  iii. a refractive index different from the refractive index of substrate
 b. At least one layer different from Lmed having a refractive index higher than 1.6,
 c. At least one layer different from Lmed having a refractive index lower than 1.55.

In the invention, the refractive index of Lmed layer is different from the refractive index of the substrate to be coated. This difference is usually larger than 0.01. In some embodiments, this difference is larger than 0.03, and may be larger than 0.05.

In addition, a collection of at least two ophthalmic lenses may be coated with the antireflective stack of the invention, and at least two ophthalmic lenses from said collection:
 a. differ in refractive index Δn by 0.035 or more;
 b. differ in reflected residual colours by ΔE, as measured by CIE Lab ΔE76; and
 c. the ratio ΔE/Δn is lower than 50, preferably lower than 40, more preferably lower than 30.

The invention relates also to a method of fabrication of spectacles comprising:
 a. Selecting two substrates having refractive index difference larger than 0.035,
 b. Coating said substrates with the same antireflective stack,
 c. Mounting said coated substrates on a single pair of spectacles.

The spectacles prepared according to this method will be cosmetically acceptable if both substrates have the same colour for wearer and observers. According to the invention, residual colours of antireflective stack coated on both substrates having different refractive indices differ by less than 10, preferably less than 5, more preferably less than 3, as measured by CIE Lab ΔE76.

EXAMPLES

Table 1 presents antireflective stacks prepared according to the invention and coated on substrates of different refractive indices.

Each layer of the antireflective stack is defined by its optical thickness expressed as quarter wavelength optical thickness, in relationship with a design wavelength of 510 nm. LI stands for Low Index, HI stands for High Index and M stands for intermediate index of three quarter wave layer.

TABLE 1

| AR stack 1 | Comparative AR stack 1 | AR stack 2 | Comparative AR stack 2 |
|---|---|---|---|
| air | air | air | air |
| 1.011 LI | 1.011 LI | 0.9485 LI | 0.9485 LI |
| 1.230 HI | 1.230 HI | 1.3762 HI | 1.3762 HI |
| 0.125 LI | 0.125 LI | 0.098 LI | 0.098 LI |
| 0.528 HI | 0.528 HI | 0.445 HI | 0.445 HI |
| 3 M | | 3M | |

TABLE 1-continued

|  | Substrate | Substrate | Substrate | Substrate |
|---|---|---|---|---|
| Substrate's refractive indices | 1.46; 1.62; 1.81 | 1.46; 1.62; 1.81 | 1.46; 1.5; 1.55; 1.6; 1.62; 1.81 | 1.46; 1.5; 1.55; 1.6; 1.62; 1.81 |
| HI refractive index | 2.2 | 2.2 | 2.2 | 2.2 |
| LI refractive index | 1.46 | 1.46 | 1.46 | 1.46 |
| M refractive index | 1.66 | 1.66 | 1.66 | 1.66 |

Table 2 compares optical performance (Rm and L*a*b* values for residual reflected light at 15° incidence, under standard illuminant D65 at 10° with CIE1964; Rv values for residual reflected light at 15° incidence, under standard illuminant D65 at 2° with CIE1931) of antireflective stack 1 coated on three different substrates (refractive indices 1.48; 1.62 and 1.81) with and without the three-quarter wave layer from the invention.

TABLE 2

| Table 2 | Lens reference | Substrate Index | Rm (%) | Rv (%) | L* | a* | b* |
|---|---|---|---|---|---|---|---|
| AR stack 1 | 1A | 1.46 | 1.349 | 0.417 | 3.77 | −0.66 | 0.87 |
|  | 1B | 1.62 | 0.418 | 0.148 | 1.34 | 0.84 | 0.33 |
|  | 1C | 1.81 | 1.028 | 0.455 | 4.11 | 2.41 | −0.25 |
| Comparative AR stack 1 | Comp1A | 1.46 | 0.807 | 0.695 | 6.28 | −10.14 | 1.30 |
|  | Comp1B | 1.62 | 0.496 | 0.201 | 1.82 | −0.98 | 0.41 |
|  | Comp1C | 1.81 | 0.756 | 0.268 | 2.42 | 8.85 | −0.54 |

All lenses show good Rm and Rv values, acceptable for ophthalmic lenses. However, lenses obtained with comparative AR stack 1 have very different residual reflected colours: ΔE76(Comp1A:Comp1C)=19.5. Lenses according to the invention have very similar reflected colours, not noticeable for the wearer: ΔE76(1A:1C)=3.3.

Table 3 compares optical performance of antireflective stack 2 coated on six different substrates (refractive indices 1.46; 1.5; 1.55; 1.6; 1.62 and 1.81) with and without the three-quarter wave layer from the invention.

TABLE 3

| Table 3 | Substrate Index | Lens Reference | Rm (%) | Rv (%) | L* | a* | b* |
|---|---|---|---|---|---|---|---|
| AR stack 2 | 1.46 | 2A | 0.475 | 0.487 | 4.40 | −2.07 | 2.95 |
|  | 1.5 | 2B | 0.437 | 0.366 | 3.31 | −0.94 | 2.49 |
|  | 1.55 | 2C | 0.440 | 0.267 | 2.41 | 0.44 | 1.93 |
|  | 1.6 | 2D | 0.494 | 0.222 | 2.01 | 1.78 | 1.39 |
|  | 1.62 | 2E | 0.528 | 0.219 | 1.98 | 2.30 | 1.17 |
|  | 1.81 | 2F | 1.173 | 0.524 | 4.74 | 6.92 | −0.74 |
| Comparative AR stack 2 | 1.46 | Comp2A | 0.978 | 0.646 | 5.83 | −5.68 | −5.68 |
|  | 1.5 | Comp2B | 0.834 | 0.491 | 4.44 | −3.80 | −4.41 |
|  | 1.55 | Comp2C | 0.709 | 0.352 | 3.18 | −1.50 | −2.75 |
|  | 1.6 | Comp2D | 0.638 | 0.268 | 2.42 | 0.73 | −1.13 |
|  | 1.62 | Comp2E | 0.624 | 0.249 | 2.25 | 1.61 | −0.50 |
|  | 1.81 | Comp2F | 0.838 | 0.418 | 3.77 | 9.40 | 5.18 |

All lenses show good Rm and Rv values, acceptable for ophthalmic lenses. However, lenses obtained with comparative AR stack 2 have very different residual reflected colours: ΔE76(Comp2A:Comp2F)=18.7 et ΔE76(Comp2B:Comp2E)=7. Lenses according to the invention have very similar reflected colours, not noticeable for the wearer: ΔE76(2A:2F)=9.7 et ΔE76(2B:2E)=3.7.

The invention claimed is:

1. An ophthalmic lens comprising a transparent substrate wherein at least one face of the substrate comprises an antireflective stack comprising:
   a layer Lmed having:
      a thickness of a three-quarter-wave layer for a design wavelength in a range of 480 nm-550 nm;
      a refractive index in a range of 1.5-1.70; and
      a refractive index different from the refractive index of substrate;
   at least one layer different from Lmed having a refractive index higher than 1.6; and
   at least one layer different from Lmed having a refractive index lower than 1.55.

2. The ophthalmic lens of claim 1, wherein the layer Lmed is in direct contact with the substrate.

3. The ophthalmic lens of claim 1, wherein the difference between the refractive index of substrate and the refractive index of three-quarter-wave layer Lmed is larger than 0.01.

4. The ophthalmic lens of claim 1, wherein the substrate is organic.

5. The ophthalmic lens of claim 1, wherein the antireflective stack comprises a number of layers higher than or equal to 5 and lower than or equal to 9.

6. The ophthalmic lens of claim 1, wherein the antireflective stack comprises at least two layers having a refractive index higher than 1.6 and at least two layers having a refractive index lower than 1.55.

7. The ophthalmic lens of claim 1, wherein the mean reflection factor $R_m$ over a wavelength range 400 nm to 700 nm for the face of the substrate coated with an antireflective stack is lower or equal to 3% for an angle of incidence lower than or equal to 35°.

8. The ophthalmic lens of claim 1, wherein the mean light reflection factor $R_v$ over a wavelength range 380 nm to 780 nm for the face of the substrate coated with an antireflective stack is lower or equal to 2% for an angle of incidence lower than or equal to 35°.

9. A collection of at least two ophthalmic lenses of claim 1, wherein at least two ophthalmic lenses from the collection:
   differ in refractive index Δn by 0.035 or more;
   differ in reflected residual colors by ΔE, as measured by CIE Lab ΔE76; and
   have a ratio ΔE/Δn of lower than 50.

10. An antireflective stack suited for coating substrates for ophthalmic lenses comprising:
   a layer Lmed having:
      a thickness of a three-quarter-wave layer for a design wavelength in a range 450 nm-580 nm;
      a refractive index in a range of 1.5-1.70; and
      a refractive index different from the refractive index of substrate;
   at least one layer different from Lmed having a refractive index higher than 1.6; and
   at least one layer different from Lmed having a refractive index lower than 1.55;
   wherein the difference between the refractive index of the substrate to be coated and the refractive index of the layer Lmed is larger than 0.01.

11. A method of fabrication of spectacles comprising:
   selecting two substrates having a refractive index difference larger than 0.035;
   coating the substrates with an antireflective stack of claim 10; and
   mounting the coated substrates on a single pair of spectacles.

12. Spectacles prepared by the method of claim 11, wherein residual colors of the antireflective stack coated on the substrates having different refractive indices differ by less than 10.

* * * * *